US005710717A

United States Patent [19]
Hong et al.

[11] Patent Number: 5,710,717
[45] Date of Patent: Jan. 20, 1998

[54] METHOD FOR PREDICTING AND ADJUSTING THE DISTRIBUTION OF TWO-PHASE FLUIDS FLOWING THROUGH A PIPING NETWORK

[75] Inventors: Ki Choong Hong; Suzanne Griston, both of Bakersfield, Calif.

[73] Assignee: Chevron U.S.A. Inc., Richmond, Calif.

[21] Appl. No.: 408,827

[22] Filed: Mar. 22, 1995

[51] Int. Cl.[6] .......... G05D 16/00

[52] U.S. Cl. .......... 364/510; 73/61.73

[58] Field of Search .......... 364/422, 505, 364/510, 557; 166/303; 73/61.73, 151, 154

[56] References Cited

U.S. PATENT DOCUMENTS

| | | | |
|---|---|---|---|
| 4,269,211 | 5/1981 | Howard et al. | 137/2 |
| 4,516,986 | 5/1985 | Jepsen | 55/18 |
| 4,522,218 | 6/1985 | Konak | 137/3 |
| 4,574,827 | 3/1986 | Konak | 137/89 |
| 4,574,837 | 3/1986 | Aggour et al. | 137/561 |
| 4,662,391 | 5/1987 | Tolley | 137/393 |
| 4,824,614 | 4/1989 | Jones | 261/76 |
| 5,010,910 | 4/1991 | Hickey | 137/1 |
| 5,040,558 | 8/1991 | Hickey et al. | 137/1 |
| 5,094,103 | 3/1992 | Wicks, III et al. | 166/303 |
| 5,472,050 | 12/1995 | Rhoten et al. | 166/303 |

OTHER PUBLICATIONS

Azzopardi et al., "Annular Two-Phase Flow Split at an Impacting T", Int. J. Multiphase Flow, vol. 13, No. 5, pp. 605–614 (1987).

Chien and Rubel, "Phase Splitting of Wet Stream in Annular Flow Through a Horizontal Impacting Tee", SPE Prod. Engr., pp. 368–74, Nov. 1992.

Hong, "Two-Phase Flow Splitting at a Pipe Tee", J. Pet. Tech., pp. 290–295, Feb. 1978.

Jones and Williams, "A Two-Phase Flow Splitting Device That Works", SPE Prod. & Facil., pp. 197–202, Aug. 1993.

Strome and McStravick, "Continous Steam Quality Measurement in a Steam Distribution System Quality Measurement", SPE Prod. Engr., pp. 259–267, Apr. 1987.

*Primary Examiner*—Emanuel T. Voeltz
*Assistant Examiner*—Thomas Peeso
*Attorney, Agent, or Firm*—Burns, Doane, Swecker & Mathis, LLP

[57] ABSTRACT

A new, improved method is disclosed for reliably and accurately predicting and adjusting vapor-liquid split ratios to branches of a piping network incorporating a plurality of impacting tee junctions for a wide range of two-phase steam or gas-liquid conditions representative of field distribution systems. The vapor velocity and liquid volume fraction of the two-phase entering an impacting tee junction are computed from measured pressure, quality and rate of a two-phase fluid entering the impacting tee junction. The velocities of the vapor split to each branch tee junction are computed from measured or computed vapor mass flow rates. The liquid volume fraction of the two-phase fluid exiting a branch or arm of the tee junction is then computed as a function of inlet vapor velocity and liquid volume fraction and from the vapor velocity exiting the branch or arm using an empirical correlation equation. Finally, the vapor mass fraction (or quality) of the two-phase fluid exiting the tee branch is computed from the liquid volume fraction exiting the branch.

13 Claims, 4 Drawing Sheets

Schematic of Impacting Tee Steam Distribution Manifold

Schematic of Impacting Tee Steam Distribution Manifold
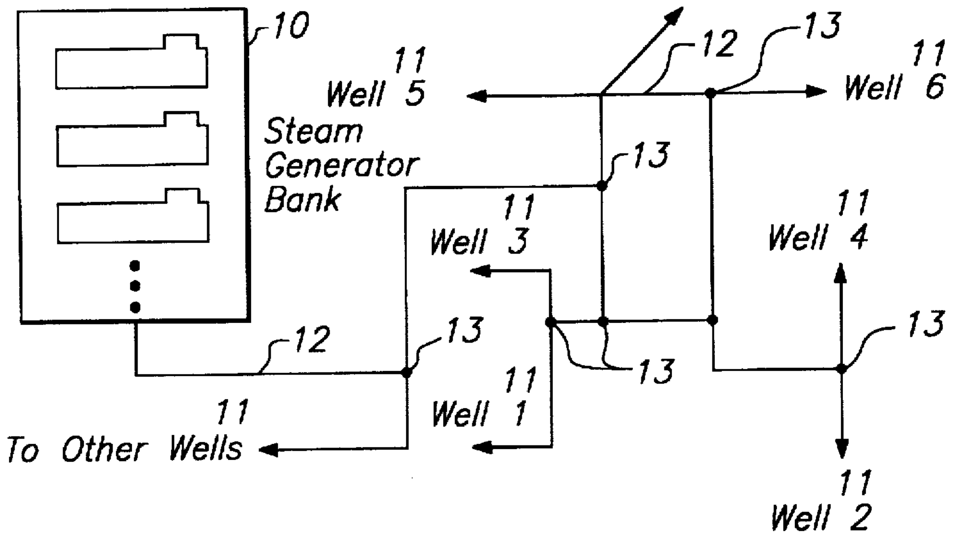
FIG. 1
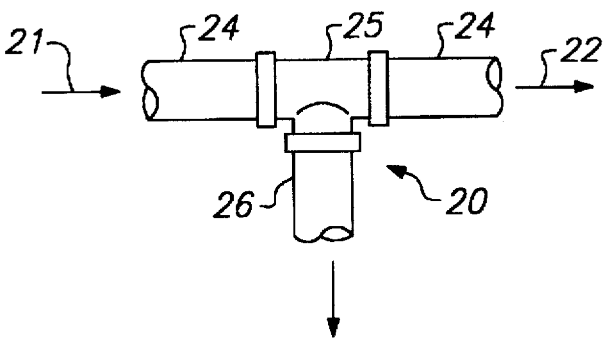
FIG. 2A Sidearm (Straight-Through)
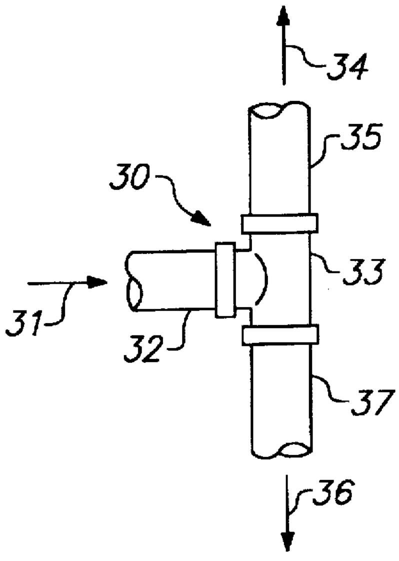
FIG. 2B Impacting (Dead-End)

Method for Predicting Quality Splits of Two-Phase Fluid Flowing through an Impacting Tee

METHOD FOR PREDICTING AND ADJUSTING THE DISTRIBUTION OF TWO-PHASE FLUIDS FLOWING THROUGH A PIPING NETWORK

FIELD OF THE INVENTION

The present invention relates to the distribution of two-phase fluids (e.g., gas-liquid, wet steam) in piping networks. One application of the invention is the prediction of two-phase steam flow splitting in oil field piping networks and nuclear power plant cooling systems for controlling the amount of heat injected into the reservoir or cooling applied to the power plant. Mother application of the invention is the prediction of two-phase flow splitting of gas-condensate in natural gas distribution networks. In both of these applications, one needs to know the amounts of liquid and vapor distributed along each branch of a piping network to optimize heat and/or mass distribution by placement of normal and/or modified impacting tees or other mechanical devices.

BACKGROUND OF THE INVENTION

In the petroleum industry, for example, steam flooding involves the injection of heat into a reservoir using two-phase steam. Effective management of steamflood projects requires controlling the amount of heat injected into the petroleum reservoir. Steam of a sufficient quality (or vapor mass fraction) must be supplied to injection wells at sufficient rates to distribute heat and mass uniformly throughout the steam flood area to maximize reservoir volumetric sweep and displacement efficiency of the hydrocarbon reservoir. Since the mechanisms by which the vapor and liquid phases displace hydrocarbons in a reservoir differ, it is also important to maintain optimum steam quality entering the reservoir. This requires the delivery of steam at a predetermined quality to a given injection wellhead at a predetermined rate. Different mechanical devices and process variations can be used to deliver the proper steam quality.

Oil field steam distribution networks are designed to deliver specified amounts of steam to each injection well. Two-phase steam, consisting of vapor and liquid phases, is generated by pumping pressurized, filtered water through a conventional single-pass oil- or gas-fired boiler unit or through a gas-fired heat recovery unit of a cogeneration system. The quality of the steam is controlled adjusting the amount of oil or gas supplied to the boiler (or generator) for a given feedwater rate. Generator steam quality and pressure are monitored on a daily basis to ensure that the desired steam output conditions are maintained. In some cases, a computerized process control system is used to automatically adjust generator operating conditions to maintain preset steam output conditions. The generated steam is then distributed to individual wells through a piping network. Critical flow chokes are used to control rates to each injection well. Impacting (or dead-end) tees are used at pipe branches in an attempt to achieve uniform (or equal) quality distribution of steam to each well.

Unfortunately, wellhead quality and rate measurements collected in various steam flood projects indicate that uneven quality (or vapor mass fraction) splits often occur whenever the mass flow rate splits deviate from a 50%–50% split at the exit branches of the pipe tee. Individual wells thus receive non-uniform or uneven and unknown (or unpredictable) distributions of the steam liquid and vapor phase distributions. Uneven liquid and vapor phase distributions result in poor displacement efficiency and volumetric sweep of the reservoir while unknown liquid and vapor phase distributions (e.g., unknown quality and rate distribution) leads to poor reservoir heat management and increased operating expenses. Therefore, it is important to develop a method to accurately predict the steam qualities split to the exit branches of an impacting tee so that adjustments can be made in the system.

The two-phase flow splitting behavior at tee junctions has been studied by many investigators. However, very limited flow splitting data is available for impacting tees. The majority of these studies have involved laboratory air-water experiments. Only one impacting tee study has been conducted using two-phase steam. One study reported results from laboratory air-water experiments for flow splitting at side-arm and impacting (dead-end) tee configurations. The results of the impacting tee tests indicated that the percentage of water split to each exit branch (or arm) of the tee was equal to the corresponding percentage of air split to each branch provided that the air split ratio does not exceed 5:1 (85%–15% split or 15%–85% split).

As a result of this study, impacting pipe tees have been used widely in California's steam flood projects. However, recent wellhead steam flow rate and quality measurements, using pressurized vessels to separate and meter the liquid and vapor phases, indicate that uneven quality splits commonly occur as a result of uneven vapor flow rate splits. Consequently, wellhead steam qualities were found to vary from 20% to 90%. The main reason for the discrepancy between the field data and the laboratory findings is that the air-water tests were run for a single set of inlet flow conditions: air velocity equal to 90 ft/sec and liquid volume fraction equal to 0.009. Steam conditions at injectors in a typical steamflood area can vary from 500 to 1000 psia pressure, 1,454 to 14,540 lbm/hr rate, and 20% to 90% quality. These conditions result in vapor velocities ranging from 5 to 70 ft/sec and liquid volume fractions ranging from 0.01 to 0.15 entering the pipe tee.

More recent studies involving air-water or wet-steam flow through impacting tees also showed that uneven quality splits occur when the vapor flow rate split to each branch deviates from a 50%–50% split. Results from these studies additionally showed that the tee branch with the lower vapor flow rate also received the lower steam quality (i.e., higher liquid volume fraction). Empirical correlation equations to predict the qualifies of split streams at impacting tees have been described in Azzopardi et al, ("Annular Two-Phase Flow Split at an Impacting T," Int. I. Multiphase Flow, Vol. 13 No. 5, 1987, pp 605–614) and Chien and Rubel ("Phase Splitting of Wet Steam in Annular Flow through a Horizontal Impacting Tee," SPE Production Engineering, November 1992, pp 368–374.)

Azzopardi et al. conducted air-water tests for 3.18 cm (1¼ inch) diameter horizontal and vertical impacting tee configurations. The mass flow rate entering the tee junction ranged from 33 to 775 lbm/hr, the vapor mass fraction entering the tee ranged from 0.21 to 0.58 and the pressure was maintained at 24.7 psia. These conditions resulted in air velocities ranging from 32 ft/sec to 71 ft/sec and liquid volume fractions ranging from 0.0015 to 0.008 entering the tee junction. The range of vapor velocities achieved in the air-water tests are representative of those found in actual field distribution systems; however, the liquid volume fractions are much lower than those in steam distribution systems, which typically range from 0.01 to 0.15. A phenomenological model was derived for the split of annular two-phase flow at an impacting tee. Comparison of predicted versus measured liquid fraction splits were in good agreement over the range of inlet air velocities for inlet liquid volume fraction below 0.002. However, predicted liquid splits varied significantly from measured liquid splits for inlet liquid volume fractions above 0.002.

Chien and Rubel conducted field-scale experiments for wet steam flowing through a two-inch diameter impacting tee. The steam conditions entering the tee ranged from 400 to 600 psig pressure, 3,500 to 30,000 lbm/hr rate and 20% to 80% quality (0.2 to 0.8 vapor mass fraction). These conditions resulted in inlet vapor velocities ranging from 40 ft/sec to 130 ft/sec. In practice, piping networks are designed to attain vapor (or gas) velocities below 70 ft/sec to avoid excessive frictional pressure loss. The percentage of vapor-phase split to a given exit branch or arm ranged from 20% to 50% (i.e., 20%–80% to 50%–50% vapor-phase splits). The resulting flow split data was used to develop two sets of correlation equations to predict steam qualities exiting the tee; one correlation predicts qualities for the arm receiving 20% to 50% of the vapor flow and another correlation predicts qualities for the arm receiving 50% to 80% of the vapor flow.

More specifically, the correlation equations developed by Chien and Rubel predict the ratio of quality exiting an arm to the quality entering the tee as a function of the ratio of mass flow exiting the arm to the total mass flow entering the tee. Unfortunately, a plot of predicted quality ratios versus measured quality ratios reported by Chien and Rubel shows considerable scatter over their range of test conditions. In addition, plots showing a comparison of predicted versus measured quality split ratios reported by Azzopardi et al. were found to be in large disagreement for low steam qualities. Chien and Rubel attribute the discrepancy to differences in the tee size, orientation and operating conditions.

The correlation equations presented by Azzopardi et al. and Chien and Rubel did not accurately predict quality splits over the entire range of their laboratory test conditions. In addition, the range of test conditions for both studies were not representative of typical two-phase flow conditions present in field distribution networks. Both studies were limited to relatively dry annular mist flow regimes; whereas, two-phase flow regimes in field steam distribution systems can range from relatively homogeneous annular mist flow to stratified or segregated flow.

Consequently, a new, improved method is needed to accurately predict and adjust vapor and liquid splits at impacting tees for a wide range of two-phase steam or gas-liquid flow conditions representative of field distribution systems.

SUMMARY OF THE INVENTION

Laboratory air-water flow split data were used to develop a correlation equation to predict and adjust quality splits downstream of an impacting tee in terms of upstream flow conditions and vapor-phase split ratio to each branch. The equation relates the liquid volume fraction exiting a tee branch (or arm), $LVF_{arm}$, to the vapor velocity and liquid volume fraction entering the tee, $V_{in}$ and $LVF_{in}$, and the fraction of vapor exiting the branch, $V_{arm}$, as follows:

$$LVF_{arm}=a*LVF_{in}*(V_{arm}/Vin)^b \quad (1)$$

The coefficients, a and b, in Equation (1) are related to the input variables, $LVF_{in}$ and $V_{in}$ as follows:

$$a=a1+a2*ln\ F+a3*F^{0.5} \quad (2)$$

$$b=b1+b2*F+b3*ln\ F+b4*F^{0.5} \quad (3)$$

where:

$$F=LVF_{in}*V_{in} \quad (4)$$

The empirical constants are:

$$a1=0.2088;\ a2=-0.2541;\ a3=0.3928 \quad (5)$$

$$b1=-3.0662;\ b2=-0.4052;\ b3=-1.0381;\ b4=2.7228 \quad (6)$$

The correlation equation, presented above as Equation (1), is used to predict the liquid volume fraction to each tee branch. The computed liquid volume fraction to each branch is then converted to vapor mass fraction (or quality) using liquid and vapor phase densities or specific volumes for a given pressure. The predictions are used to improve displacement efficiency and volumetric sweep of reservoirs by placement of impacting tees or other mechanical devices in the networks. A detailed step-by-step procedure for wet steam will be outlined in the detailed description of the embodiments. This procedure can be incorporated into a programmable hand-held calculator, a PC spreadsheet program or other PC program using a standard ANSI language (e.g., FORTRAN, BASIC, PASCAL).

Equation (1) fits the laboratory air-water flow split data very well, with a goodness of fit of 0.98. The correlation equation (1) was also used to predict actual quality splits obtained during the field steam flow tests. Predicted quality splits were found to be in very good agreement with actual steam quality splits.

BRIEF DESCRIPTION OF THE DRAWINGS

In order to assist the understanding of this invention, reference will now be made to the appended figures (or drawings). The figures are exemplary only, and should not be construed as limiting the invention.

FIG. 1 is a schematic of a typical piping network incorporating a plurality of impacting tee junctions to distribute two-phase steam from a generator plant to a plurality of injection wells.

FIGS. 2A and 2B illustrate the side-arm tee and impacting (or dead-end) tee configurations, respectively.

DETAILED DESCRIPTION OF THE INVENTION

Figure 3:
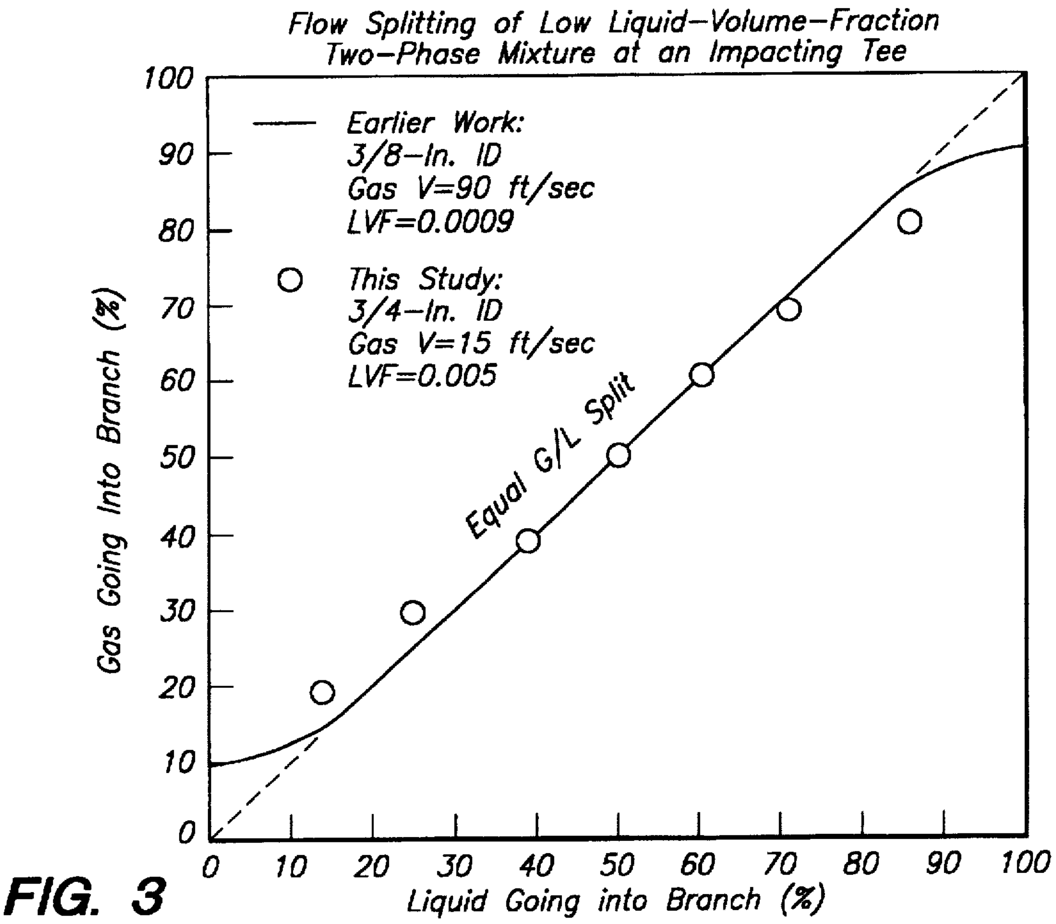
FIG. 3 is a plot showing the proportions of gas to liquid flow splits using a normal impacting tee in accordance with current field practice at two different vapor velocities and very low liquid -volume fractions (less than 0.01) entering the tee junction.

Nomenclature $LVF_{in}$=liquid volume fraction of two-phase fluid exiting tee arm or branch $LVF_{in}$=liquid volume fraction of two-phase fluid entering the tee $V_{arm}$=gas or vapor velocity exiting an arm or branch of the tee, ft/sec $V_{in}$=gas or vapor velocity entering the tee, ft/sec $d_i$=pipe inner diameter, ft d=choke bean diameter, inches $A_c=\pi d_i^2/4$=cross-sectional flow area, $ft^2$ $v_g$=vapor-phase specific volume, fta/lbm $v_L$=liquid-phase specific volume, fta/lbm $i_{rs}$=steam flow rate, bbls/day (cold water equivalent)

$W_g$=vapor mass flow rate, lbm/hr $P_1$=Steam pressure upstream of wellhead choke, psia $P_s$=Steam pressure upstream of tee junction, psia Referring now to the drawings, FIG. 1 illustrates schematically, a steam distribution system for assisted oil recovery using a steam generator bank 10 supplying a multiplicity of wells 11 through a piping net work consisting of plurality of flow lines 12 and impacting tees 13. Flow configurations through a side-arm tee 20 and an impacting tee 30 are depicted in FIGS. 2A and 2B. As indicated by flow arrows 21, 22 and 23 in FIG. 2A, the primary feed of two-phase fluid 21 enters the straight-through arm 24 with a portion of the two-phase flow 23 diverted (or separated) at tee junction 25 through side-arm (or branch) 26 and the remainder of the two-phase flow 22 remaining in the straight-through arm 24. In contrast, two-phase flow through the impacting or dead-end tee 30 shown in FIG. 2B consists of the primary feed of two-phase fluid 31 flowing through inlet arm 32 and entering the tee junction 33 with a portion of the two-phase fluid 34 then diverted through exit arm 35 and the remainder of the two-phase fluid 36 diverted through exit arm 37.

While the impacting tee configuration of FIG. 2B is substantially better in splitting two-phase flow than the side-arm tee configuration of 2A, we have found that the impacting tee is generally capable of splitting the vapor and liquid phases to maintain uniform vapor-liquid ratios for a very narrow range of inlet flow conditions (e.g., vapor velocity, liquid volume fraction, and pressure). FIG. 3 particularly illustrates in graphic form the very low range of inlet liquid volume fractions (LVF) for which uniform splitting of the gas and liquid phases occurs at a normal impacting tee.

In accordance with the present invention, laboratory air-water and field steam flow tests were conducted to: 1) obtain a better understanding of two-phase flow splitting at impacting tees and 2) develop a reliable and accurate method for predicting the steam qualities (vapor mass fraction) of split streams flowing to each exit branch (arm) of the tee. A detailed description of the apparatus and procedures used during laboratory and field testing can be found in the inventors' prior technical paper presented at the Society of Petroleum Engineers' (SPE) Western Regional Meeting held in Long Beach, Calif., Mar. 23–25, 1994, as publication number SPE 27866.

In general, the following conclusions can be drawn from the wide range of two-phase flow data obtained from laboratory air-water and field steam flow tests of normal and modified impacting tee designs:

1. Laboratory air-water and field two-phase steam test data were found to be in good agreement, indicating that air-water mixtures behave like wet steam (or vice versa) for comparable vapor velocities and liquid volume fractions.

2. Normal impacting tees split the liquid-phase disproportionately to the vapor-phase when the percentage of vapor split to each branch deviates from 50%–50% split (or 1:1).

3. The disproportionate vapor-liquid splitting becomes more pronounced as the vapor velocity and/or liquid volume fraction entering the normal impacting tee increases.

In accordance with the present invention, a new, improved method and means for reliably and accurately predicting and adjusting vapor-liquid split ratios to branches of a piping network incorporating a plurality of impacting tee junctions for a wide range of two-phase steam or gas-liquid conditions representative of field distribution systems has been developed.

The laboratory air-water flow split data were used to develop a correlation equation (1) to predict quality splits downstream of an impacting tee in terms of upstream flow conditions and vapor-phase split ratio to each branch or arm. FIGS. 4A through 4D are plots showing predicted versus actual liquid volume fraction splits to an arm of a normal impacting tee for four different inlet air velocities and three different inlet liquid volume fractions. A goodness of fit of 0.98 was obtained with the resulting correlation equation.

Figure 5:
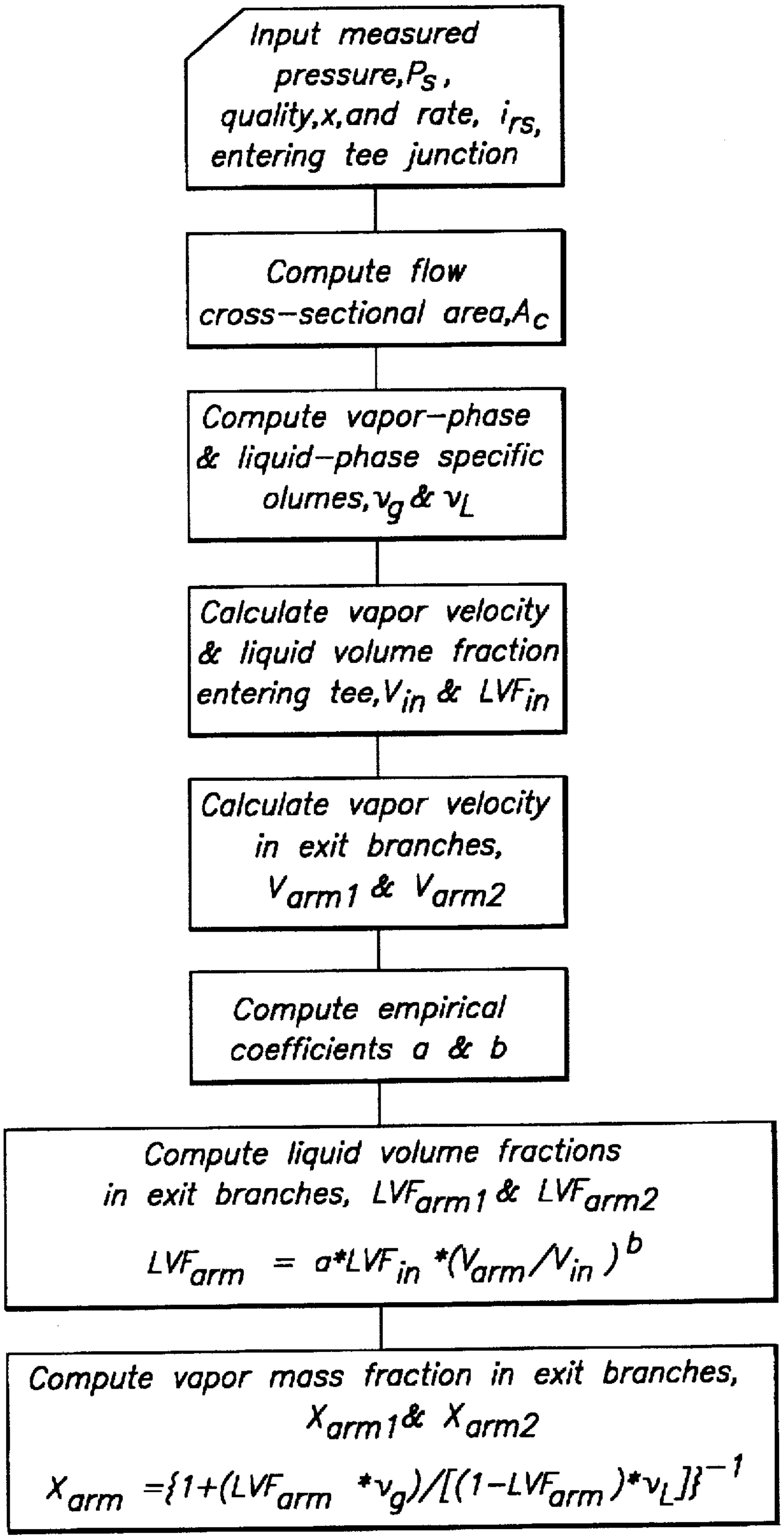
FIG. 5 is a flow chart that schematically illustrates the new, improved method of predicting the liquid volume fraction to each tee branch.

A procedure for predicting steam quality splits at an impacting tee is outlined in FIG. 5. The procedure for predicting the quality splits at each impacting tee junction is as follows:

1. Steam pressure ($p_s$) , quality (x) , and rate ($i_{rs}$) are measured at the inlet of the impacting tee.

2. Compute flow cross-sectional area, $A_c$. Where $$A_c=\pi d_i^2/4 \qquad (1)$$

3. Obtain vapor-phase and liquid-phase specific volumes, $v_g$ and $v_L$, at steam pressure, $p_s$, from steam tables or compute phase specific volumes using properties equations.

4. Calculate vapor velocity entering tee junction, $V_{in}$, in ft/sec. Where $$V_{in}=0.00405\times i_{rs}\, v_g/A_c \qquad (2)$$

5. Calculate liquid volume fraction entering tee junction, $LVF_{in}$. Where $$LVF_{in}=(1-x)v_L/[(1-x)\_v_L+x\, v_g] \qquad (3)$$

6. Compute vapor velocity in exit branch or arm of tee, $V_{arm}$. Where $$V_{arm}=V_{in} * \text{(Fraction of steam exiting arm)} \qquad (4)$$

7. Compute coefficients, a and b, in Equation (1). Where $$a=a1+a2*ln\ (LVF_{in}*V_{in})+a3*(LVF_{in}*V_{in})^{0.5} \qquad (5)$$

$$b=b1+b2*(LVF_{in}*V_{in})+b3*ln(LVF_{in}*V_{in})+b4*(LVF_{in}*V_{in})^{0.5} \qquad (6)$$

a1=0.2088; a2=−0.2541; a3=0.3928;

b1=−3.0662; b2=−0.4052; b3=−1.0381; b4=2.7228

8. Calculate liquid volume fraction exiting the tee branch, $LVF_{arm}$. Where:

$$LVF_{arm}=a*LVF_{in}*(V_{arm}/V_{in})^b \qquad (7)$$

9. Compute vapor mass fraction (or quality) of steam exiting the tee branch, $x_{arm}$. Where:

$$x_{arm}=\{1+(LVF_{arm}*v_g)/[(1-LVF_{arm})*\_v_L]\}^{-1} \quad (8)$$

10. Repeat steps 6 through 9 for other exit branch or arm.

In order to use the above procedure, the amount of vapor exiting a tee branch must be known. This can be determined from wellhead choke data using the following steps:

11. Compute vapor mass flow rate, $W_g$, to arm. Where $$W_g=857.9\ d^2\ (1-0.0423/d)*(P_1/\_v_g)^{0.5} \quad (9)$$

12. Convert vapor mass flow rate to vapor velocity, $V_{arm}$, in ft/sec. Where:

$$V_{arm}=W_g*v_g/A_c \quad (10)$$

Alternatively, the vapor mass flow rate to an arm can be measured using separator vessel and the vapor velocity in the arm can be computed from equation (10).

Figure 6:
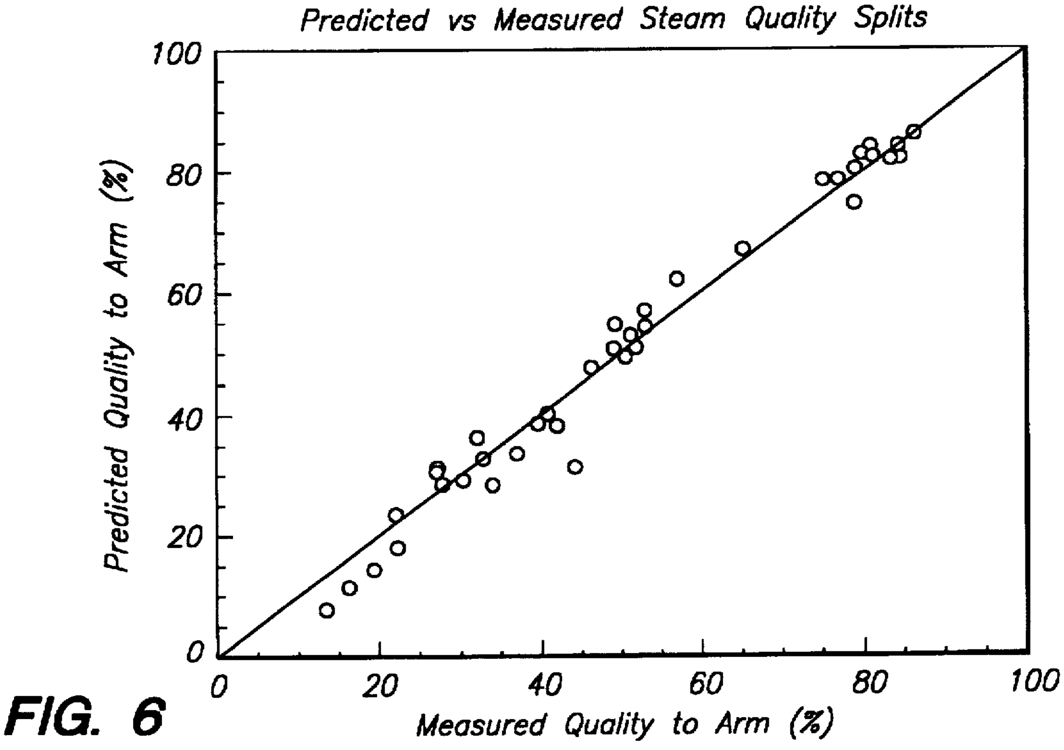
FIG. 6 is a plot showing a comparison of predicted versus actual steam quality splits for a normal impacting tee.
Figure 4B:
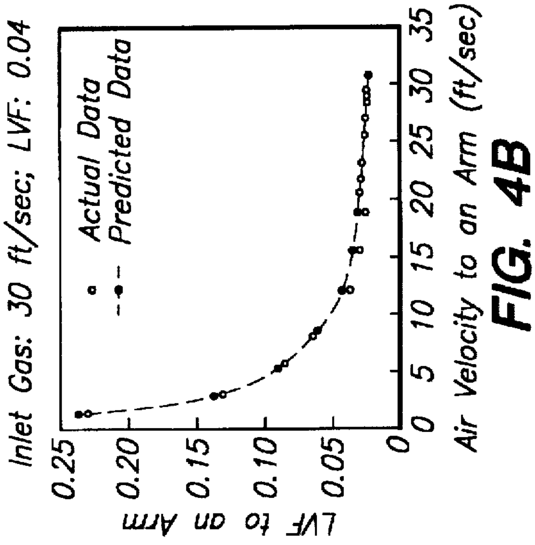
FIGS. 4A through 4D are plots showing predicted versus actual liquid volume fraction splits to an arm of a normal impacting tee for four different inlet air velocities and three different inlet liquid volume fractions.
Figure 4D:
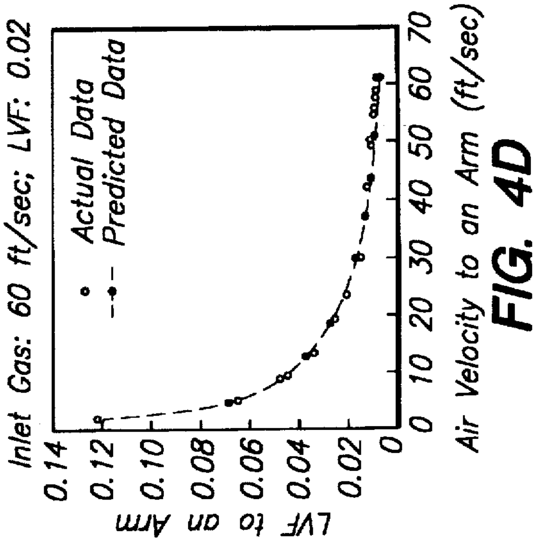
Figure 4A:
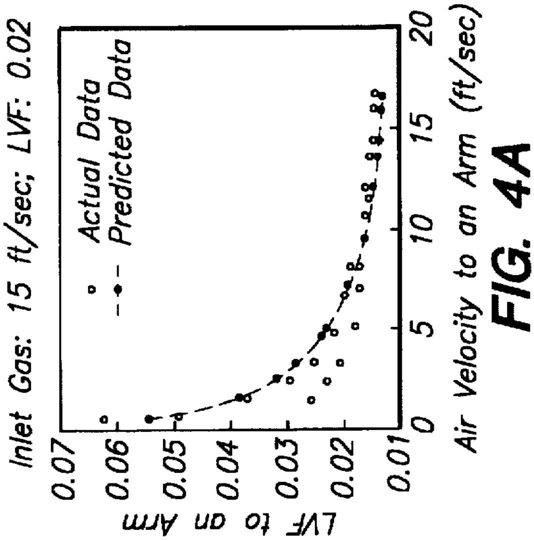
Figure 4C:
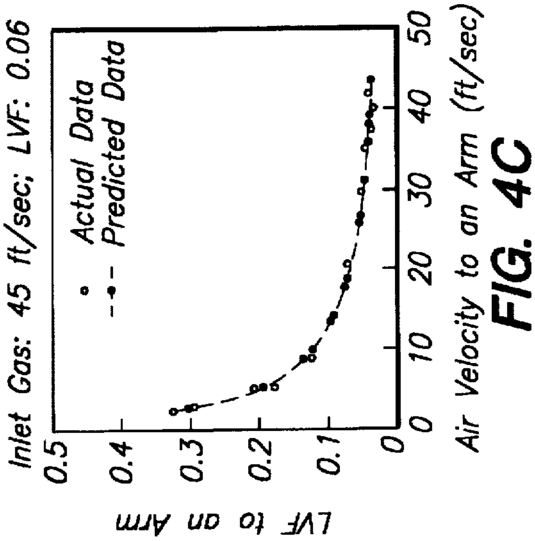

Comparison of predicted and actual steam qualities split to the exit branches of a normal impacting tee is shown in FIG. 6. The predicted quality splits estimated from the empirical correlation are in very good agreement with measured quality splits over the entire range of steam flow conditions tested. Therefore, it appears that the correlation and procedure outlined above provides accurate and reliable prediction of vapor-liquid splits at normal impacting tees over a wide range of two-phase flow conditions (5 to 75 ft/sec vapor velocity and 0.01 to 0.15 liquid volume fraction entering the tee and vapor split ratios from 50%–50% to 15%–85% or 85%–15% exiting the tee).

In order to use the above procedure in a steam distribution network, incorporating a plurality of impacting tee junctions, as shown in FIG. 1, the steam flow rate and quality entering the first tee junction must be known. This can be obtained from feedwater rate and steam quality measurements at the steam generator(s). In addition, the vapor flow rate at each injection well must be known. This can be estimated using the critical flow equation (9) for wellhead chokes or can be measured with a separator vessel. The vapor flow rate into an exit arm or branch of a given tee is simply the sum of all of the measured or computed rates for all wells served by that arm. Similarly, the vapor rate entering a tee is the sum of the two exit branch rates so determined. Steps 1 through 12 are then repeated for each subsequent tee junction using the exit branch vapor velocities and liquid volume fractions from the previous tee junction as the inlet conditions for the new tee until flow splits for all tee junctions have been computed.

Once the qualifies to each exit branch or arm of the impacting tee have been determined from the disclosed procedure, this information can be used in the design of a new piping network to establish how effectively heat and mass will be distributed to or from individual wells. Additionally, this information can be used to evaluate the heat and mass distribution in an existing piping network and identify specific locations in the network that require mechanical modification, such as the insertion of devices at tee junctions to improve liquid-vapor splits. Another application of the heat and mass distribution information obtained from the above quality splits is in the optimization of heat utilized in steam flood projects. In such optimization, steam injection can be shut in at specified wells and/or prolonged to other specified wells to account for uneven quality splits in existing piping networks to improve sweep and displacement efficiency of the hydrocarbon reservoir.

Knowing the predicted quality splits, branches of the network are modified by placing improved impacting tees in the network like those described in copending, commonly assigned application Ser. No. 08/408,587 entitled "Method and Apparatus for Controlling the Distribution of Two-Phase Fluids Through Impacting Pipe Tees", inventors Ki Choon Hong and Suzanne Griston, which disclosure is incorporated in its entirety into this application.

Other devices can be used in the network to adjust the steam quality such as a vertical distribution pot and a homogenizing orifice, orifice devices inserted upstream and downstream of the tee junction, or a static mixer and stratifier inserted upstream of a branching tee. The predicted qualities can also be used to adjust the quality of steam supplied by a boiler by controlling the amount of oil or gas supplied to the boiler.

While the present invention has been described with reference to specific embodiments, this application is intended to cover those various changes and substitutions that may be made by those skilled in the art without departing from the spirit and scope of the appended claims.

What is claimed is:

1. A method for managing the mount of heat injected into a reservoir in a steam flood project comprising the steps of:

a. measuring the pressure, quality and rate of a two-phase fluid entering an impacting tee junction;

b. determining the flow cross-sectional area of a pipe inlet to the tee junction;

c. determining the vapor-phase and liquid-phase specific volumes at measured inlet pressure, or obtaining said specific volumes from steam tables when the two-phase fluid is wet steam;

d. determining the vapor velocity entering the tee junction;

e. determining the liquid volume entering the tee junction;

f. determining the vapor velocity in a first tee branch or arm;

g. computing coefficients, a and b, wherein $$a=a1+a2*ln(LVF_{in}*V_{in})+a3*(LVF_{in}*V_{in})^{0.5}$$

and $$b=b1+b2*(LVF_{in}*V_{in})+b3*ln(LVF_{in}*V_{in})+b4*(LVF_{in}*V_{in})^{0.5}$$

and a1=0.2088; a2=−0.2541; a3=0.3928;

b1=−3.0662; b2=−0.4052; b3=−1.0381; b4=2.7228;

h. calculating the liquid volume fraction of fluid exiting the first tee branch wherein $$LVF_{arm}=a*LVF_{in}*(V_{arm}/V_{in})^b$$

i. computing vapor mass fraction of fluid exiting the first tee branch, wherein $$x_{arm}=\{1+(LVF_{arm}*v_g)/[(1-LVF_{arm})*\_v_L]\}^{-1}$$

j. determining the vapor velocity in a second tee branch or arm;

k. calculating the liquid volume fraction of fluid exiting the second tee branch;

l. computing vapor mass fraction of fluid exiting the second tee branch; and m. controlling the amount of heat injected into the reservoir based on the vapor mass fraction of the fluid exiting the first tee branch and the second tee branch.

2. The method of claim 1 wherein the vapor mass fraction exiting the tee branch or arm is determined from separator vessel measurements and the vapor velocity exiting the tee branch is obtained from a measured mass flow rate wherein $$V_{arm}=W_g*v_g/A_c.$$

3. The method of claim 1 wherein the vapor mass fraction exiting the tee branch or arm is determined from wellhead choke data using $$W_g=857.9\ d^2(1-0.0423/d)*(P_1/\_v_g)^{0.5}$$

and the vapor velocity exiting the tee branch is obtained from a measured mass flow rate wherein $$V_{arm}=W_g*v_{g/Ac}.$$

4. The method of claim 1, wherein:

a. the vapor velocity and liquid volume fraction entering the first tee junction is obtained from feedwater rate and steam quality measurements at the steam generator(s);

b. the vapor flow rate into a tee branch or arm is the sum of all measured or computed rates for all wells served by that arm; and c. the vapor rate entering a second, third, and other subsequent tee junctions in said steam flood project is the sum of the vapor rates exiting the tee branches as previously determined.

5. The method of claim 1 wherein the controlling step is:

restricting the flow through the tee junction to improve liquid-vapor splits.

6. The method of claim 1 wherein the controlling step is:

shutting in selected wells to improve sweep and displacement efficiency of the reservoir.

7. The method of claim 1 wherein the controlling step is:

prolonging steam injection in selected wells to improve sweep and displacement efficiency of the reservoir.

8. A method for managing the amount of liquid and vapor distributed in an impacting tee junction comprising the steps of:

a. measuring the pressure, temperature, quality and rate of a two-phase fluid entering the impacting tee junction;

b. determining the flow cross-sectional area of a pipe inlet to the tee junction;

c. determining the vapor-phase and liquid-phase specific volumes at measured inlet pressure and temperature;

d. determining the vapor velocity entering the the junction;

e. determining the liquid volume entering the tee junction;

f. determining the vapor velocity in a first tee branch or arm;

g. computing coefficients, a and b, wherein $$a=a1+a2*ln(LVF_{in}*V_{in})+a3*(LVF_{in}*V_{in})^{0.5}$$

and $$b=b1+b2*(LVF_{in}*V_{in})+b3*ln(LVF_{in}*V_{in})+b4*(LVF_{in}*V_{in})^{0.5}$$

h. calculating the liquid volume fraction of fluid exiting the first tee branch wherein $$LVF_{arm}=a*LVF_{in}*(V_{arm}/V_{in})^b$$

i. computing vapor mass fraction of fluid exiting the first tee branch, wherein $$x_{arm}=\{1+(LVF_{arm}*v_g)/[(1-LVF_{arm})*\_v_L]\}^{-1}$$

j. determining the vapor velocity in a second tee branch or arm;

k. calculating the liquid volume fraction of fluid exiting the second tee branch;

l. computing vapor mass fraction of fluid exiting the second tee branch; and m. controlling the amount of liquid and vapor exiting the first tee branch and the second tee branch.

9. The method of claim 8 wherein:

$$a1=0.2088;\ a2=-0.2541;\ a3=0.3928;$$

$$b1=-3.0662;\ b2=-0.4052;\ b3=-1.0381;\ \text{and}\ b4=2.7228.$$

10. The method of claim 8 wherein the vapor mass fraction exiting the tee branch or arm is determined from separator vessel measurements and the vapor velocity exiting the tee branch is obtained from a measured mass flow rate wherein $$V_{arm}=W_g*v_g/A_c.$$

11. The method of claim 8 wherein the vapor mass fraction exiting the tee branch or arm is determined from wellhead choke data using $$W_g=857.9\ d^2(1-0.0423/d)*(P_1/\_v_g)^{0.5}$$

and the vapor velocity exiting the tee branch is obtained from a measured mass flow rate wherein $$V_{arm}=W_g+v_g/A_c.$$

12. The method of claim 8, wherein:

a. the vapor velocity and liquid volume fraction entering the first tee junction is obtained from measurement;

b. the vapor flow rate into a tee branch or arm is the sum of all measured or computed rates for all elements fed by that arm; and c. the vapor rate entering a second, third, and other subsequent tee junctions in a piping network is the sum of the vapor rates exiting the tee branches as previously determined.

13. The method of claim g wherein the controlling step is:

restricting the flow through the tee junction to improve liquid-vapor splits.

* * * * *